July 28, 1964  D. H. MARTIN ETAL  3,142,544
APPARATUS FOR STRIPPING CONTAMINATED CATALYTIC MATERIAL
Filed Oct. 14, 1960
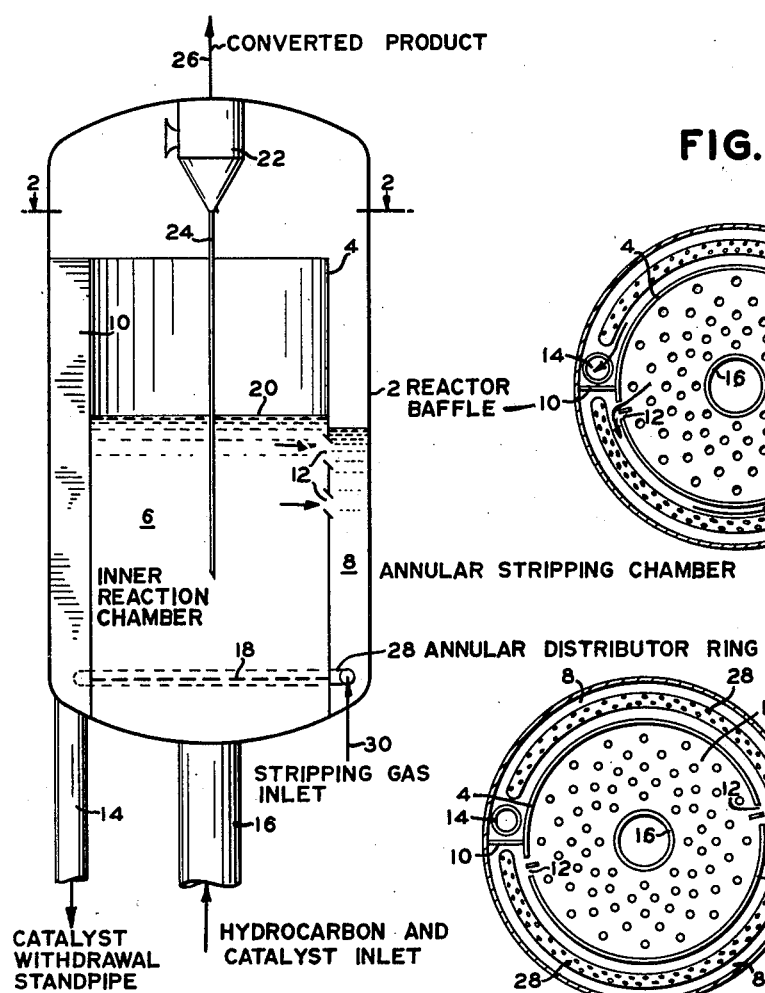
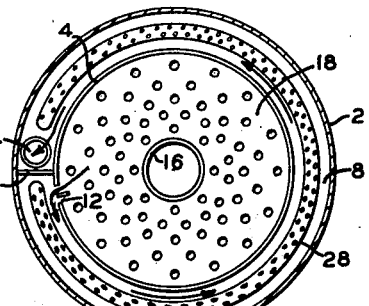
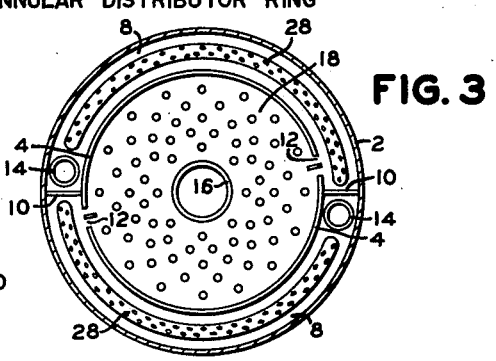
INVENTORS
DOUGLAS H. MARTIN
PAUL S. NIX, JR.
BY
ATTORNEY
AGENT United States Patent Office 3,142,544
Patented July 28, 1964

3,142,544
APPARATUS FOR STRIPPING CONTAMINATED CATALYTIC MATERIAL
Douglas H. Martin, Harrington Park, and Paul S. Nix, Jr., Woodbury, N.J., assignors to Pullman Incorporated, a corporation of Delaware
Filed Oct. 14, 1960, Ser. No. 62,774
3 Claims. (Cl. 23—288)

This invention relates to contacting finely divided solid particle material with gasiform material. More particularly, the invention relates to the method and means for stripping finely divided solid particle material of product material in a fluidized condition with stripping gas.

In chemical reactions, and particularly reactions involving the catalytic conversion of hydrocarbons wherein the catalyst or solid particle material becomes combined with volatile and non-volatile carbonaceous material, the particle material is usually periodically regenerated prior to employing the particle material for additional conversion of hydrocarbons. To effect removal of entrained or adsorbed volatile and difficultly volatilizable hydrocarbonaceous material from the finely divided particle material, it is the practice to first strip the particle material withdrawn from the reaction zone countercurrently with a relatively inert gaseous material in a stripping zone and thereafter the catalytic or particle material is withdrawn from the stripping zone and passed to a regeneration zone wherein non-stripped carbonaceous material adsorbed on the catalytic material is removed by burning in the presence of an oxygen-containing gas. When incomplete or inefficient stripping of the catalytic material is practiced, valuable hydrocarbon materials are passed to the regeneration zone and burned therein, thereby reducing the recovery of desired products in the conversion step.

It is a principal object of this invention to provide improvements in the method and means for stripping catalytic material containing hydrocarbon products of reaction prior to passing the catalytic material to a regeneration zone.

Other objects and advantages of the present invention will become apparent from the following description.

The present invention is directed to contacting a relatively dense fluid bed of catalytic material superimposed by a more dilute phase of catalytic material with stripping gas in an elongated annular passageway as the fluid bed of catalytic material moves generally horizontally therethrough. More specifically, it is proposed circumscribing a hydrocarbon conversion zone containing a relatively dense fluid bed of catalytic material superimposed by a more dilute phase of catalytic material with said elongated annular passageway wherein the relatively dense fluid bed of catalytic material containing entrained and adsorbed hydrocarbon products of reaction is maintained at an elevated temperature above, below or substantially equal to the temperature of the conversion zone. The catalytic material in the annular stripping zone is contacted with upwardly flowing stripping gas throughout substantially the total length thereof as the relatively dense fluid mass of catalytic material flows longitudinally through the annular passageway or stripping zone. More particularly, catalytic material containing residual hydrocarbon material thereon is withdrawn from the hydrocarbon conversion zone beneath the dense phase level thereof, introduced to one end of an elongated annular stripping zone in indirect heat exchange with the hydrocarbon conversion zone and the catalytic material maintained in a fluidized condition in the annular stripping zone under elevated hydrocarbon decomposition temperatures for an extended period of time while introducing gaseous stripping material to the lower portion thereof. Accordingly, during decomposition or cracking of adsorbed hydrocarbons on the catalytic material in the elongated stripping zone, the catalytic material is progressively and incrementally stripped with fresh stripping gas as the fluidized catalytic material moves generally horizontally or longitudinally through the annular stripping zone to the opposite end thereof provided with a suitable standpipe catalyst withdrawal means for removing the thus treated and stripped catalytic material for passage to a regeneration zone. Gaseous stripping material and stripped products of reaction recovered from the dense fluid bed of catalytic material are removed from the upper portion of the annular passageway, combined with the hydrocarbon conversion products of the reaction zone and removed from the reaction zone for separation into desired products.

The reaction zone to which the hydrocarbon material is introduced with catalytic material for conversion into desired products is maintained at an elevated temperature within the range of from about 800° F. to about 1000° F., more usually from about 850° F. to about 975° F. The catalytic material removed from the reaction zone at substantially the same temperature continues to crack hydrocarbons adsorbed thereon into lighter components, if given sufficient time and the adsorbed hydrocarbons may be more completely removed and recovered when given proper treatment with stripping gas. The extent of additional cracking of the adsorbed residual hydrocarbons on the catalyst occurring within the stripper compartment may be considered as a function of the catalyst residence time within the stripper, with a prolonged residence time being the most beneficial for maximum recovery of hydrocarbon material therefrom. Accordingly this invention relates to the method and means for stripping catalytic material containing entrained and adsorbed hydrocarbon materials whereby the residence time of the catalytic material in the stripping zone is maximized to optimize the recovery of adsorbed hydrocarbon decomposition products, as well as to obtain more efficient and complete recovery of volatile hydrocarbons entrained in the catalytic material. It is proposed, therefore, to accomplish the above and obtain maximum residence or hydrocarbon decomposition time of the adsorbed hydrocarbons on the catalyst by passing the catalyst as a relatively dense fluid bed at elevated hydrocarbon decomposition or cracking temperatures, generally horizontally through an elongated stripping compartment circumscribing a relatively large diameter reaction zone containing a fluid bed of catalytic material therein while providing an inlet for the catalyst to the annular stripper substantially adjacent to the stripped catalyst outlet separated by a substantially vertical transverse baffle member within the annular stripper. Accordingly, by this arrangement the catalytic material passing through the elongated annular stripping zone will be subjected to a relatively long or extended period of hydrocarbon decomposition time of at least about 1 minute and more usually greater than 1 minute, depending upon the diameter of the reactor chamber about which the annular stripper chamber is positioned.

In another embodiment it is contemplated employing one or more semi-circular annular stripper compartments around the periphery of the reactor compartment with a catalyst inlet and outlet at the opposite ends of each of the semi-cicular annular stripper compartments. For example, there may be two separate semi-circular annular stripper compartments circumscribing the reaction zone such that the catalytic material withdrawn from one side of the reaction zone and introduced to one end of an annular stripping compartment moves generally horizontally therethrough to the opposite side of the reaction zone and amounting to about one half the total distance around the reaction zone before being withdrawn from the opposite end of the stripping zone and passed to a regeneration zone. In any of these embodiments the length of the annular stripper circumscribing the reaction zone will be dependent upon the catalyst residence time desired and the diameter of the reaction zone being employed. Accordingly, in some instances it may be desirable to employ a single continuous annular stripper compartment which extends substantially all the way around the reactor compartment, particularly when employing small diameter reactor compartments. On the other hand, when employing larger diameter reactor compartments, the annular stripper may extend only a portion of the way around the reactor chamber, depending upon the catalyst residence time desired, which is dependent upon the time required for the catalytic material to horizontally traverse the annular stripper compartment.

It is to be understood that the relationship of the annular stripper compartment to the reaction compartment as described in accordance with this invention is generally employed in conjunction with a regeneration compartment and in this respect may be employed in a wide variety of apparatus arrangements. For example, the reactor-regenerator relationship may be in a side by side arrangement or the regenerator may be positioned above or below the reactor with the stripper arrangement specifically descibed herein suitably positioned intermediate the flow of contact material from the reactor to the regenerator. For example, the annular stripper may circumscribe the regenerator. In any of these arrangements suitable transfer means, such as passageways or conduits, are provided for transferring finely divided particle material from the reactor chamber to the stripping chamber, to the regeneration chamber and from the regeneration chamber to the reaction chamber in order to provide for continuous circulation of particle material through the system.

It is proposed in accordance with this invention to obtain the maximum advantages attributed to intermixing in fluid bed operations, prolonged residence time, elevated temperature stripper conditions and benefits obtained from progressively contacting the catalyst with increments of fresh stripping gas as the catalyst moves longitudinally through the annular stripping zone. Accordingly, temperature conditions employed in the stripper may be maintained above, below or substantially equal to the hydrocarbon conversion temperature conditions and will be selected and maintained in the stripper to optimize hydrocarbon decomposition and efficient stripping of the catalytic material entraining hydrocarbon material. As hereinbefore described, the relatively dense fluid bed of catalytic material is caused to move generally horizontally through a relatively long annular stripping zone under elevated temperature conditions while introducing gasiform stripping material to the bottom or lower portion of the annular bed throughout substantially the total length thereof. While the height of the fluid bed of catalytic material longitudinally flowing through the annular stripper compartment may be maintained over a relatively wide range and preferably above about 5 feet in height, it is preferred that the velocity of the stripping gas be sufficient to maintain the annular bed of catalytic material in a relatively dense fluid condition and within a range of from about 0.1 to about 3.0 feet per second, preferably below about 2.5 feet per second while maintaining a catalyst mass flow horizontally through the stripper in the range of from about 300 to about 1000 lbs./min./sq. ft. Furthermore, it is preferred that the height of the annular stripper compartment, particularly when opened in the upper portion thereof to the reaction zone and when separated from the reaction zone by a common substantially vertical baffle member, be sufficient to substantially reduce passage of catalytic material from the reaction zone to the annular stripping zone, except through suitable slots or openings such as passageways provided in the baffle member.

It is contemplated in an embodiment of this invention of separating or dividing the distributor means positioned in the lower portion of the annular stripping chamber into a plurality of segments for separate and independent flow control of stripping gas therethrough. That is, the distributor means in the lower portion of the annular stripping chamber may be separated into a plurality of separate stripping gas distributor means which may be independently controlled with respect to the rate of flow of stripping gas therethrough. By this arrangement the velocity of the stripping gas passing upwardly through the contact material in the annular stripper may be independently controlled as desired over a relatively wide range, thereby permitting changing or maintaining the catalyst bed density the same or of different density within sections of the annular stripper, as desired.

Having thus given a general description of the improved method and means of this invention, reference is now had to the drawings wherein FIGURE 1 presents diagrammatically in elevation an arrangement of apparatus for practicing the invention described herein and FIGURES 2 and 3 present diagrammatically in cross-section arrangements of the apparatus of FIGURE 1.

Referring now to FIGURE 1, by way of example, a reactor vessel 2 is shown provided with a substantially vertical cylindrical baffle member 4 to form an inner cylindrical reaction chamber 6 surrounded by an annular stripping chamber 8 within vessel 2. A vertical baffle member 10 is positioned across the annular stripping chamber 8. Slot means or passageways 12 are provided in vertical baffle 4 for passing catalytic material from a dense fluidized bed of catalytic material in the reactor chamber 6 into one end of the annular stripper 8 with a standpipe 14 being provided at the opposite end of the annular stripper 8 for withdrawing stripped catalytic material therefrom. Hydrocarbon reactant material and catalytic material is introduced to the bottom of vessel 2 by way of conduit 16, passed upwardly through grid 18 into a relatively dense fluid bed of catalytic material thereabove maintained in reaction chamber 6 under elevated temperature conversion conditions. Hydrocarbon conversion products are removed from the fluid bed of catalytic material having an upper level 20 and passed through suitable cyclone separator equipment shown as 22. In cyclone separator 22 catalytic material entrained in the hydrocarbon conversion products is separated from the hydrocarbon products and returned to the fluid bed of catalytic material by dipleg 24 with the hydrocarbon conversion products being withdrawn from the vessel by conduit 26 for separation into desired products. In accordance with this invention catalytic material containing both volatile and difficultly volatilizable carbonaceous material deposited on the catalyst during conversion of the hydrocarbon reactant material is withdrawn from the reaction zone and passed by way of slots 12 into the annular stripping chamber or zone 8 wherein the catalytic material is maintained in a relatively dense fluidized condition by stripping gas introduced to the lower portion thereof by a suitable stripping gas distributor means such as a perforated annular distributor ring 28 supplied with stripping gas by conduit 30.

For a better understanding of the improved method and means of this invention reference is now had to FIGURE 2 presenting a cross-sectional view of FIGURE 1. The contaminated catalytic material passed from the fluid bed of catalytic material in reaction zone 6 by slots 12 into the annular stripping zone as discussed with respect to FIGURE 1 is then caused to move generally horizontally or longitudinally through the annular stripping zone around the reaction zone as a relatively dense fluid bed of catalytic material to standpipe 14 positioned at the opposite end of the annular stripping zone. During traverse of the fluid bed of catalytic material in the annular stripping zone the catalytic material is continuously stripped with increments of fresh stripping gas introduced to the bottom portion of the annular stripper zone prior to the catalyst being passed to a regeneration zone by standpipe 14, not shown. Stripped products of reaction or stripping gas are removed from the upper portion of the annular stripper which is in open communication with the upper portion of the reaction zone wherein the stripped products of reaction are combined with the hydrocarbon conversion products removed from the bed of catalyst in the reaction zone. Referring now to FIGURE 3, which is a modification of FIGURE 2, the annular stripper circumscribing the reaction zone is divided into two separate semi-circular annular stripping zones, the size or length of which will be dependent upon the diameter of the reactor and the desired residence time of the catalytic material flowing generally horizontally through the annular stripper. Slots 12 are provided at one end of the two separate semi-circular stripping compartments with suitable standpipes provided at the opposite end. Accordingly, the annular stripper may be divided such that contaminated catalytic material withdrawn from one side of the reaction zone moves substantially half way around the reaction zone through the annular stripper compartment to a standpipe or stripped catalyst withdrawal means located at the opposite end of each of the annular stripper sections for withdrawal of stripped catalytic material therefrom. One advantage of the improved annular stripper arrangement described herein resides in maintaining the catalytic material during stripping in a fluid condition, which maximizes distribution of heat throughout the fluid bed of catalyst, particularly when maintaining the annular stripper in indirect heat exchange with the relatively hot fluid bed of catalytic material in the reaction zone throughout substantially the total length of travel of the catalytic material through the annular stripper. Another advantage of the improved method of stripping described herein resides in the infinite number of vertical stripping sections within the annular stripper wherein the catalyst is passed in contact with fresh stripping gas.

Although the present invention has been specifically described with respect to the catalytic conversion of hydrocarbons, it is to be understood that this is by way of example only and the invention may be advantageously employed in other processes employing finely divided solid particle contact material requiring removal of entrained and adsorbed reactant material and/or products of reaction. Furthermore, various changes and modifications may be made to the method and means of this invention without departing from the spirit thereof.

We claim:

1. An apparatus comprising in combination a reaction chamber, a vertical cylindrical baffle member open at its upper end extending upwardly from the bottom of said reactor chamber to the upper portion thereof to form an annular stripping chamber therewith, a substantially vertical transverse baffle member extending upwardly through said annular stripping chamber from the bottom of said reactor chamber, open passageway means in the upper portion of said cylindrical baffle member communicating between said reactor chamber and one end of said annular stripping chamber, means for withdrawing contact material from the opposite end of said annular stripping chamber substantially adjacent to said transverse baffle member, means for introducing gaseous material to the lower portion of said annular stripping chamber, means for introducing reactant material and contact material to the lower portion of said reactor chamber and means for removing gasiform material from the upper portion of said reactor chamber.

2. An apparatus comprising in combination a substantially vertical cylindrical reactor chamber, a substantially vertical annular stripping chamber in open communication in the upper portion thereof with the upper portion of said reactor chamber, said annular stripping chamber partitioned by a substantially vertical transverse baffle member so that finely divided contact material is passed by open passageway means from said reactor chamber to said annular stripping chamber adjacent to one side of said transverse baffle member and must flow longitudinally through said annular stripping chamber to a withdrawal passageway on the opposite side of said transverse baffle member, means for introducing gaseous material to the lower portion of said annular stripping chamber, a distributor grid across the lower cross-section of said reactor chamber, means for introducing gasiform material and finely divided contact material beneath said grid for flow upwardly into said reactor chamber and means for removing gasiform material from the upper portion of said annular stripping chamber and said reactor chamber.

3. A system for handling finely divided contact material which comprises, a reactor chamber, means for maintaining a relatively dense fluid bed of contact material having an upper dense phase level in said reactor chamber, an annular stripping chamber, said annular stripping chamber divided by a plurality of substantially vertical transverse baffle members into a plurality of semi-circular annular stripping chambers, means for maintaining a relatively dense fluid bed of contact material having an upper dense phase level in each of said stripping chambers, means for passing contact material from beneath the upper dense phase level of contact material in said reactor chamber into one end of each of said stripping chambers and means for withdrawing contact material from the opposite end of each of said stripping chambers.

References Cited in the file of this patent

UNITED STATES PATENTS

| | | |
|---|---|---|
| 2,612,433 | Nicolai et al. | Sept. 30, 1952 |
| 2,728,642 | Cunningham et al. | Dec. 27, 1955 |
| 2,958,653 | Kruse | Nov. 1, 1960 |